July 13, 1926. 1,592,186

C. J. DUMBOLTON

THRASHER

Filed June 10, 1924

Inventor
Charles J. Dumbolton.

By Clarence A. O'Brien
Attorney

Patented July 13, 1926.

1,592,186

UNITED STATES PATENT OFFICE.

CHARLES J. DUMBOLTON, OF ROCKFORD, IOWA.

THRASHER.

Application filed June 10, 1924. Serial No. 719,189.

This invention relates to grain thrashing machines, and it consists in the novel features hereinafter described and claimed.

An object of the invention is to provide a thrashing machine of simple and durable structure, having its parts so arranged and assembled that the thrashing of the grain may be accomplished in a regular and even manner, whether the straw is wet or dry, or is loose or bound in bundles.

A further object of the invention is to provide an assemblage of parts and features whereby the loose or shelled grain is quickly separated from the straw.

With the above objects in view, the thrasher comprises a casing having at its grain receiving end a feed pan and provided within the receiving opening with a pair of cylinders, one arranged above the other, the center of the upper cylinder being located above the feed pan, and the center of the lower cylinder being located below the feed pan. A concave is arranged within the casing below the inner lower portion of the upper cylinder.

Figure 1:
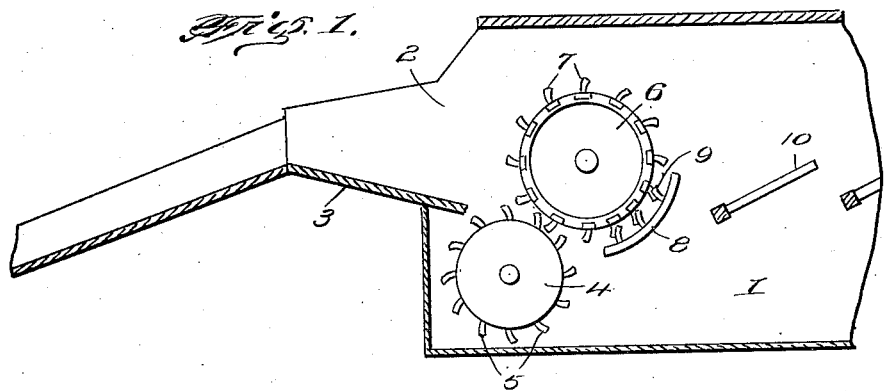
Figure 1 is a longitudinal sectional view of the thrasher.
Figure 2:
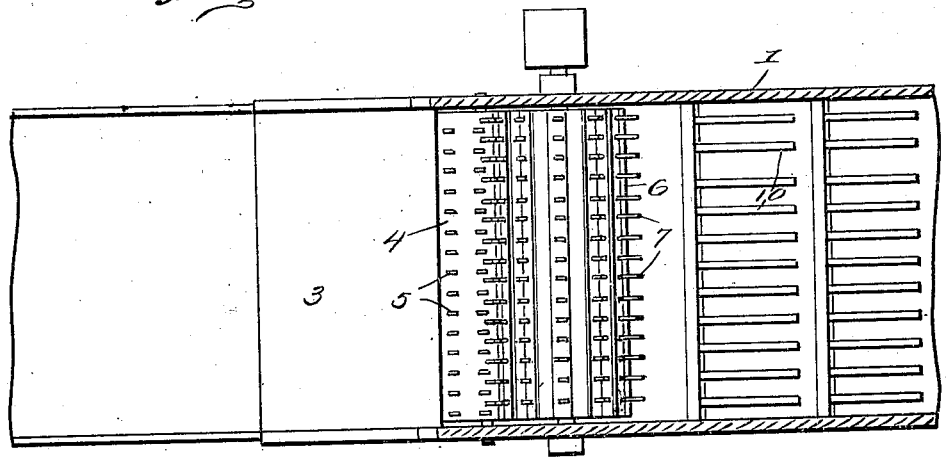
Figure 2 is a similar horizontal sectional view thereof.

The thrasher comprises a casing 1, having at one end a grain inlet opening 2, and a feed pan 3 disposed below said opening and projecting into the intermediate portion of the casing 1. A cylinder 4 is journalled for rotation in the casing 1 below the opening 2 and below the feed pan 3, and is provided with the usual teeth 5 upon its periphery. A cylinder 6 is journalled for rotation in the casing 1, above the cylinder 4, and slightly behind the same, and is provided upon its periphery with the usual teeth 7. The center of the cylinder 6 is above the feed pan 3, and the center of the cylinder 4 is below the said feed pan. A concave section 8 is located within the casing 1, below the inner lower portion of the cylinder 6, and is provided upon its upper surface with the usual teeth 9. Straw racks 10 are mounted in the casing 1 in a usual manner.

As the grain and straw moves over the feed pan 3 and passes through the opening 2, the straw is drawn between the cylinders 6 and 4, and the loose grain in the straw falls upon the bottom of the casing 1 and is promptly separated from the straw. The straw is carried around by the teeth upon the cylinder 6 and passes between the teeth 9 of the concave 8, and the grain is knocked from the heads of the straw. The straw and grain passes upon the racks 10, and the grain is separated from the straw and falls upon the bottom of the casing 1, in the usual manner, and the straw is moved over the racks to the exit end of the casing 1 (not shown).

Having described the invention, what is claimed is:

A thrasher of the class described comprising an elongated casing provided at one end with a feed opening, a comparatively large transversely disposed toothed roller mounted for rotation in the casing and having its top portion disposed above the bottom of said opening, a second and smaller transversely disposed toothed roller mounted for rotation in the lower portion of the casing beneath said first named roller and having its teeth in mesh with the teeth of the first named roller, the top portion of said smaller roller being disposed on a plane below the bottom of said opening, a feed pan extending into and through said opening and terminating in spaced relation from said rollers to deliver the grain between the intermeshing teeth of said rollers, and a toothed concave extending crosswise of the opening and located beneath and having its teeth cooperating with the teeth of the first named roller.

In testimony whereof I affix my signature.

CHARLES J. DUMBOLTON.